US00RE48154E

(19) United States
(12) Reissued Patent
McClure

(10) Patent Number: US RE48,154 E
(45) Date of Reissued Patent: Aug. 11, 2020

(54) SYSTEM AND METHOD FOR INTEGRATING AUTOMATIC ELECTRICAL STEERING WITH GNSS GUIDANCE

(71) Applicant: AGJUNCTION LLC, Hiawatha, KS (US)

(72) Inventor: John A. McClure, Scottsdale, AZ (US)

(73) Assignee: AGJUNCTION LLC, Scottsdale, AZ (US)

(21) Appl. No.: 15/211,865

(22) Filed: Jul. 15, 2016

Related U.S. Patent Documents

Reissue of:
(64) Patent No.: 8,781,685
Issued: Jul. 15, 2014
Appl. No.: 13/944,767
Filed: Jul. 17, 2013

U.S. Applications:
(60) Provisional application No. 61/672,621, filed on Jul. 17, 2012.

(51) Int. Cl.
*G05D 1/02* (2020.01)
*B62D 5/04* (2006.01)
(Continued)

(52) U.S. Cl.
CPC ..... *G05D 1/0278* (2013.01); *A01B 69/008* (2013.01); *B62D 1/286* (2013.01);
(Continued)

(58) Field of Classification Search
CPC . B62D 1/286; B62D 1/02; B62D 3/00; B62D 3/04; B62D 3/10; B62D 5/04;
(Continued)

(56) References Cited

U.S. PATENT DOCUMENTS 515,286 A 2/1894 Dyer
2,400,868 A 12/1944 Le Tourneau
(Continued)

FOREIGN PATENT DOCUMENTS

AU 2002325645 B2 3/2003
AU 2002325645 9/2007
(Continued)

OTHER PUBLICATIONS

Trimble Navigation Limited, "AgGPS EZ-Steer Sales Brochure", http://www.trimble.com/Agriculture/, last accesed 2011, (last updated Mar. 2010).
(Continued)

*Primary Examiner* — Samuel G Rimell
(74) *Attorney, Agent, or Firm* — Schwabe Williamson & Wyatt

(57) ABSTRACT

A guidance and vehicle control system for automatically steering a vehicle, such as an agricultural vehicle or a tractor, through a field. The system includes a GNSS receiver and antenna for determining the vehicle's instantaneous position, a guidance CPU, and an automatic steering subsystem integrated with the vehicle's electrical power system. The automatic steering subsystem can be interfaced with the steering column of the vehicle, and mechanically activates the steering column, thereby steering the vehicle according to instructions received from the CPU based upon the vehicle's position and a predetermined path. An interrupt element, such as a wheel movement sensor or a slip gear, may be interfaced with the automatic steering subsystem to allow for manual steering override of the automatic steering control.

11 Claims, 4 Drawing Sheets

(51) Int. Cl.
*B62D 1/28* (2006.01)
*A01B 69/04* (2006.01)
*G01S 19/14* (2010.01)

(52) U.S. Cl.
CPC ..... *B62D 5/046* (2013.01); *G01S 19/14* (2013.01); *G05D 1/027* (2013.01); *G05D 2201/0201* (2013.01)

(58) Field of Classification Search
CPC .... B62D 5/0409; B62D 5/0421; B62D 5/092; B62D 6/00; B62D 5/046; A01B 69/008; A01B 69/007; A01D 41/1278; G05D 1/0278; G05D 1/021; G05D 1/027; G05D 2201/0201; G01S 19/14
See application file for complete search history.

(56) References Cited

U.S. PATENT DOCUMENTS 3,727,710 A 4/1973 Sanders et al.
3,899,028 A 8/1975 Morris et al.
4,132,272 A 1/1979 Holloway et al.
4,180,133 A 12/1979 Collogan et al.
4,319,654 A 3/1982 Ujita
4,453,614 A 6/1984 Allen et al.
4,637,474 A 1/1987 Leonard
4,741,409 A 5/1988 Westercamp et al.
4,802,545 A 2/1989 Nystuen et al.
4,858,132 A 6/1989 Holmquist
4,918,607 A 4/1990 Wible
5,031,704 A 7/1991 Fleischer et al.
5,152,347 A 10/1992 Miller
5,156,219 A 10/1992 Schmidt et al.
5,194,851 A 3/1993 Kraning et al.
5,207,239 A 5/1993 Schwitalla
5,234,070 A * 8/1993 Noah ..... A01B 69/008 180/169
5,255,756 A 10/1993 Follmer et al.
5,369,589 A 11/1994 Steiner
5,390,125 A 2/1995 Sennott et al.
5,430,654 A 7/1995 Kyrtsos et al.
5,476,147 A 12/1995 Fixemer
5,511,623 A 4/1996 Frasier
5,592,382 A 1/1997 Colley
5,612,883 A 3/1997 Shaffer et al.
5,615,116 A 3/1997 Gudat et al.
5,644,139 A 7/1997 Allen et al.
5,646,844 A 7/1997 Gudat et al.
5,663,879 A 9/1997 Trovato et al.
5,664,632 A 9/1997 Frasier
5,684,476 A 11/1997 Anderson
5,684,696 A 11/1997 Rao et al.
5,717,593 A 2/1998 Gvili
5,725,230 A 3/1998 Walkup
5,765,123 A 6/1998 Nimura et al.
5,810,095 A 9/1998 Orbach et al.
5,838,562 A 11/1998 Gudat et al.
5,913,375 A * 6/1999 Nishikawa ..... B62D 6/00 180/167
5,918,558 A 7/1999 Susag
5,923,270 A 7/1999 Sampo et al.
5,928,309 A 7/1999 Korver et al.
5,935,183 A 8/1999 Sahm et al.
5,941,317 A 8/1999 Mansur
5,945,917 A 8/1999 Harry
5,949,371 A 9/1999 Nichols
5,956,250 A 9/1999 Gudat et al.
5,987,363 A 11/1999 Keller et al.
6,014,608 A 1/2000 Seo
6,052,647 A 4/2000 Parkinson et al.
6,070,673 A 6/2000 Wendte
6,076,612 A 6/2000 Carr et al.
6,101,795 A * 8/2000 Diekhans ..... A01D 41/1278 180/401
6,198,992 B1 3/2001 Winslow
6,199,000 B1 3/2001 Keller et al.
6,212,453 B1 4/2001 Kawagoe et al.
6,233,511 B1 5/2001 Berger et al.
6,236,916 B1 5/2001 Staub et al.
6,257,357 B1 7/2001 Teal et al.
6,275,357 B1 8/2001 Teal et al.
6,314,348 B1 11/2001 Winslow
6,336,066 B1 1/2002 Pellenc et al.
6,377,889 B1 4/2002 Soest
6,389,345 B2 5/2002 Phelps
6,397,147 B1 5/2002 Whitehead
6,397,569 B1 * 6/2002 Homburg ..... A01B 69/007 56/10.2 F
6,424,054 B1 7/2002 Onnen et al.
6,431,576 B1 8/2002 Viaud et al.
6,434,462 B1 8/2002 Bevly et al.
6,445,983 B1 9/2002 Dickson et al.
6,463,374 B1 10/2002 Keller et al.
6,469,663 B1 10/2002 Whitehead et al.
6,484,827 B2 11/2002 Teal et al.
6,501,442 B2 12/2002 Nichols
6,539,303 B2 3/2003 McClure et al.
6,553,299 B1 4/2003 Keller et al.
6,553,311 B2 4/2003 Lange et al.
6,577,952 B2 6/2003 Geier et al.
6,581,717 B1 * 6/2003 Sørensen ..... B62D 5/09 180/401
6,622,091 B2 9/2003 Perlmutter et al.
6,631,916 B1 10/2003 Miller
6,643,576 B1 11/2003 O Connor et al.
6,688,403 B2 2/2004 Bernhardt et al.
6,703,973 B1 3/2004 Nichols
6,711,501 B2 3/2004 McClure et al.
6,789,014 B1 9/2004 Rekow et al.
6,804,587 B1 10/2004 O Connor et al.
6,819,780 B2 11/2004 Benson et al.
6,865,465 B2 3/2005 McClure
6,876,920 B1 4/2005 Mailer
6,923,288 B2 8/2005 Szabela
6,932,184 B2 8/2005 Wittmeijer
7,020,555 B1 3/2006 Janky et al.
7,065,440 B2 6/2006 Aral
7,142,956 B2 * 11/2006 Heiniger et al. ..... 701/23
7,162,348 B2 1/2007 McClure et al.
7,191,061 B2 * 3/2007 McKay ..... A01B 69/008 701/23
7,225,060 B2 5/2007 O'Connor et al.
7,277,792 B2 10/2007 Overschie
7,290,633 B2 11/2007 Kasten et al.
7,349,779 B2 3/2008 Nelson ..... B62D 1/02 701/41
7,363,132 B2 4/2008 Lange et al.
7,383,114 B1 6/2008 Lange et al.
7,383,916 B2 6/2008 Genz
7,400,957 B2 7/2008 Hofer et al.
7,437,230 B2 10/2008 McClure et al.
7,460,942 B2 12/2008 Mailer
7,477,973 B2 1/2009 Brewer et al.
7,574,290 B2 8/2009 Gibson et al.
7,578,361 B2 8/2009 Thacher
7,588,088 B2 9/2009 Zachman
7,648,002 B2 1/2010 Easton et al.
7,648,004 B1 1/2010 Larouche et al.
7,689,354 B2 3/2010 Heiniger et al.
7,762,135 B2 7/2010 Hertzman et al.
7,764,365 B2 7/2010 Nichols et al.
7,838,808 B1 11/2010 Ake
7,860,628 B2 12/2010 Lange
7,913,800 B2 3/2011 Graeve et al.
7,917,654 B2 3/2011 Toivonen
7,941,759 B2 5/2011 Kreissl et al.
7,970,519 B2 6/2011 Green
8,004,397 B2 8/2011 Forrest et al.
8,081,987 B2 12/2011 Manson et al.
8,112,201 B2 2/2012 Aral
8,116,977 B2 2/2012 Aral et al.
8,140,223 B2 3/2012 Whitehead et al.
8,190,337 B2 5/2012 McClure

(56) References Cited

U.S. PATENT DOCUMENTS

| | | | | |
|---|---|---|---|---|
| 8,239,083 | B2 * | 8/2012 | Durkos | G05D 1/0219 700/245 |
| 8,265,826 | B2 | 9/2012 | Feller et al. | |
| 8,437,901 | B2 | 5/2013 | Anderson | |
| 8,583,315 | B2 * | 11/2013 | Whitehead et al. | 701/31.4 |
| 8,594,879 | B2 * | 11/2013 | Roberge et al. | 701/23 |
| 8,634,993 | B2 * | 1/2014 | McClure et al. | 701/50 |
| 8,639,416 | B2 * | 1/2014 | Jones et al. | 701/41 |
| 8,649,930 | B2 | 2/2014 | Reeve et al. | |
| 8,892,308 | B2 * | 11/2014 | Davis | B62D 1/28 701/41 |
| 2002/0072850 | A1 | 6/2002 | McClure et al. | |
| 2003/0187560 | A1 | 10/2003 | Keller et al. | |
| 2004/0186644 | A1 | 9/2004 | McClure et al. | |
| 2004/0210357 | A1 | 10/2004 | McKay et al. | |
| 2006/0167600 | A1 | 7/2006 | Nelson, Jr. et al. | |
| 2008/0195268 | A1 | 8/2008 | Sapilewski et al. | |
| 2009/0099730 | A1 * | 4/2009 | McClure et al. | 701/41 |
| 2009/0121932 | A1 | 5/2009 | Whitehead et al. | |
| 2009/0164067 | A1 * | 6/2009 | Whitehead et al. | 701/41 |
| 2010/0312428 | A1 * | 12/2010 | Roberge et al. | 701/23 |
| 2011/0015817 | A1 | 1/2011 | Reeve | |
| 2011/0018765 | A1 | 1/2011 | Whitehead et al. | |
| 2011/0054729 | A1 | 3/2011 | Whitehead et al. | |
| 2012/0059554 | A1 | 3/2012 | Omelchenko et al. | |
| 2012/0130593 | A1 | 5/2012 | Davis et al. | |
| 2012/0174445 | A1 | 7/2012 | Jones et al. | |
| 2012/0215410 | A1 * | 8/2012 | McClure et al. | 701/50 |

FOREIGN PATENT DOCUMENTS

| | | | |
|---|---|---|---|
| WO | 200024239 | A1 | 5/2000 |
| WO | 2002080652 | A1 | 10/2002 |
| WO | 2003019430 | A1 | 3/2003 |
| WO | 2008080193 | A1 | 7/2008 |
| WO | WO-2008080193 | | 7/2008 |
| WO | 2010005945 | A1 | 1/2010 |
| WO | WO-2010005945 | | 1/2010 |

OTHER PUBLICATIONS

Web page for Orthman Manufacturing co. regarding the Tracer Quick-Hitch:, www.orthman.com/htm/guidance.htm.

David M. Bevly; Comparison of INS vs. Carrier-Phase DGPS for Attitude Determination in the Control of Off-Road Vehicles; ION 55th Annual Meeting; Jun. 28-30, 1999; Cambridge, Massachusetts; pp. 497-504.

U.S. Appl. No. 60/465,146, filed Mar. 20, 2003, McClure et al.

Listing of Related Cases, Jul. 25, 2016, 1 page.

Noh, Kwang-Mo, Self-tuning controller for farm tractor guidance, Iowa State University Retrospective Theses and Dissertations, Paper 9874, (1990).

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

Levine, Mike "Driving a Pickup with Electric Steering", http://news.pickuptrucks.com/2010/05/driving-a-pickup-with-electric-power-steering.html, (May 31, 2010).

Topcon Precision Agriculture, "AES-25 Accurate Electric Steering", http://www.topconpa.com/products/guidance-systems/electric-steering/aes-25, accessed Oct. 3, 2011.

* cited by examiner

SYSTEM AND METHOD FOR INTEGRATING AUTOMATIC ELECTRICAL STEERING WITH GNSS GUIDANCE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a reissue application of U.S. patent application Ser. No. 13/944,767, filed Jul. 17, 2013, now issued U.S. Pat. No. 8,781,685, issued Jul. 15, 2014 which* claims priority in U.S. Provisional Patent Application Ser. No. 61/672,621, filed Jul. 17, 2012, which [is] *are all* incorporated herein by reference.

BACKGROUND OF THE INVENTION

1. Field of the Invention

The present invention relates generally to automated equipment control using inputs based on global navigation satellite system (GNSS) navigation, and in particular to using an automatic steering system to guide between crop rows and against furrow row edges in agricultural applications.

2. Description of the Related Art

Current automated agricultural vehicle guidance and equipment control systems with GNSS-based technology and automatic steering can guide equipment through fields and control their operation with little or no direct human interaction. GNSS-based guidance systems are adapted for displaying directional guidance information to assist operators with manually steering the vehicles. For example, the OUTBACK S™ steering guidance system, which is available from AgJunction LTC (www.agjunction.com) and is covered by U.S. Pat. No. 6,539,303 and No. 6,711,501, which are incorporated herein by reference, includes an on-board computer capable of storing various straight-line and curved ("contour") patterns. An advantage of this system is its ability to retain field-specific cultivating, planting, spraying, fertilizing, harvesting and other patterns in memory. This feature enables operators to accurately retrace such patterns. Another advantage relates to the ability to interrupt operations for subsequent resumption by referring to system-generated logs of previously treated areas.

Another type of GNSS vehicle guidance equipment automatically steers the vehicle along all or part of its travel path and can also control an agricultural procedure or operation, such as spraying, planting, tilling, harvesting, etc. Examples of such equipment are shown in U.S. Pat. No. 7,142,956, which is incorporated herein by reference. U.S. Pat. No. 7,437,230 shows satellite-based vehicle guidance control in straight and contour modes, and is also incorporated herein by reference. U.S. Pat. No. 7,162,348 is incorporated herein by reference and discloses an articulated equipment position control system and method whereby a working component, such as an implement, can be guided independently of a motive component, such as a tractor. The implement can optionally be equipped with its own GNSS antenna and/or receiver for interacting with a tractor-mounted GNSS system.

Ideally crops would be planted in perfectly straight, evenly-spaced rows. Guidance through such fields would consist of following relatively simple straight-line patterns. Such guidance modes are commonly referred to as straight line or "A-B" in reference to the equipment traveling in a straight line between point A and point B in a repeating pattern in order to cover an entire field, which is typically flat and rectangular and therefore efficiently divided into multiple, parallel swaths. However, field conditions in many areas are not suitable for A-B guidance. For example, hilly terrain sometimes requires the formation of constant-elevation terraces.

Guidance systems accommodate such irregular conditions by operating in "contour following" modes consisting of curvilinear tracks defined by multiple GNSS points along which the equipment is guided. Initial planting passes made with manual and visually-guided navigation, which may or may not be supplemented with GNSS navigational aids, can cause crop rows to deviate from straight lines. Accommodating such irregular crop rows in subsequent operations (e.g., spraying and harvesting) may require the equipment to deviate from straight-line passes.

Notwithstanding recent advances in GNSS-based guidance accuracy, the natural irregularities of row crop cultivation tend to compromise the effectiveness of navigation based solely on location-finding front satellite signals. Moreover, satellite signals are occasionally lost due to interference from atmospheric conditions, weather and electromagnetic fields (EMF). There are various levels of differential accuracy available for GNSS. The use of these can cause offsets and drifts, especially over the crop growth season from field preparation to harvesting. One option to compensate for such lapses in GNSS reception, inertial navigation systems (INS) with gyroscopes has been utilized for relatively short-term, supplemental guidance input.

An alternative concept includes automatic steering control upon collision detection by electrically or hydraulically controlling the physical steering control of the vehicle. Many systems accommodate operators overriding the automated functions. For example, an operator may respond to observed, actual field conditions in order to maintain the equipment on course. Custom applicators, who use their equipment on multiple farms, need guidance equipment capable of universal operation for optimizing their productivity while minimizing crop damage and avoiding vehicle collision on ground that is uneven or otherwise difficult to traverse. Such equipment should be usable by operators with minimal training operating at optimal speeds and should have the capacity for storing and recalling field data for reuse, for example front season-to-season. Higher equipment speeds also tend to create auto-steering discrepancies, which can lead to crop damage from equipment overruns.

Having an automatic steering system which detects user input and automatically disengages the steering system would lead to a synthesis between machine and man, resulting in the best of both worlds. Existing hydraulic steering systems make it difficult to override automatic control when manual control is desired. Such a system can be implemented simply and cheaply into existing machines, as opposed to the more intricate and expensive hydraulic steering systems currently being used.

All-terrain vehicles (ATVs) often utilize electrical steering assist consisting of a worm drive connected to an electrical steering motor for steering over and around obstacles and for power assist, e.g., at low speeds. Such a drive can also be used to provide automatic steering in an agricultural vehicle, with manual over-ride through the use of a built-in slip gear.

Heretofore there has not been available an automatic steering system for an agricultural vehicle with the advantages and features of the present invention.

SUMMARY OF THE INVENTION

In the practice of the present invention, a system and method are provided for automatically controlling vehicles and equipment using GNSS and an electrical auto-steering system connected directly to the steering column. For example, agricultural equipment comprising a tractor and an implement can be equipped with a vector position and heading sensor subsystem including a GNSS receiver and antennas and an inertial (gyroscopic) subsystem with X, Y and Z axis sensors for sensing equipment attitude changes through six degrees of freedom. The GNSS and INS/gyroscopic input subsystems can be housed in a common enclosure for mounting on the tractor roof. A microprocessor-based controller processes the inputs and automatically controls the vehicle steering system in response thereto.

Using GNSS with auto-steering systems can provide further advantages. This invention allows manual or transparent switching between these modes, and also provides for a safety mechanism whereby the user's manual movement of the steering will automatically stop the automatic steering subsystem. Calibration of the recent line curvatures and offsets from previously logged GNSS tracks can be used to switch between modes while minimizing any crop damage should visual edge detection be lost. The edges can be defined by furrows, physical plants visible against soil or touching plants from adjacent rows. The main aspect of this invention applies an electrical automatic steering subsystem to an agricultural vehicle guided by GNSS.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof Global navigation satellite systems (GNSS) are broadly defined to include GPS (U.S.), Galileo (European Union, proposed), GLONASS (Russia), Beidou (China), Compass (China, proposed), IRNSS (India, proposed), QZSS (Japan, proposed) and other current and future positioning technology using signals from satellites, with or without augmentation from terrestrial sources, Inertial navigation systems (INS) include gyroscopic (gyro) sensors, accelerometers and similar technologies for providing output corresponding to the inertia of moving components in all axes, i.e. through six degrees of freedom (positive and negative directions along transverse X, longitudinal Y and vertical Z axes). Yaw, pitch and roll refer to moving component rotation about the Z, X and Y axes respectively. Said terminology will include the words specifically mentioned, derivatives thereof and words of similar meaning.

II. Preferred Embodiment System 2

Figure 1:
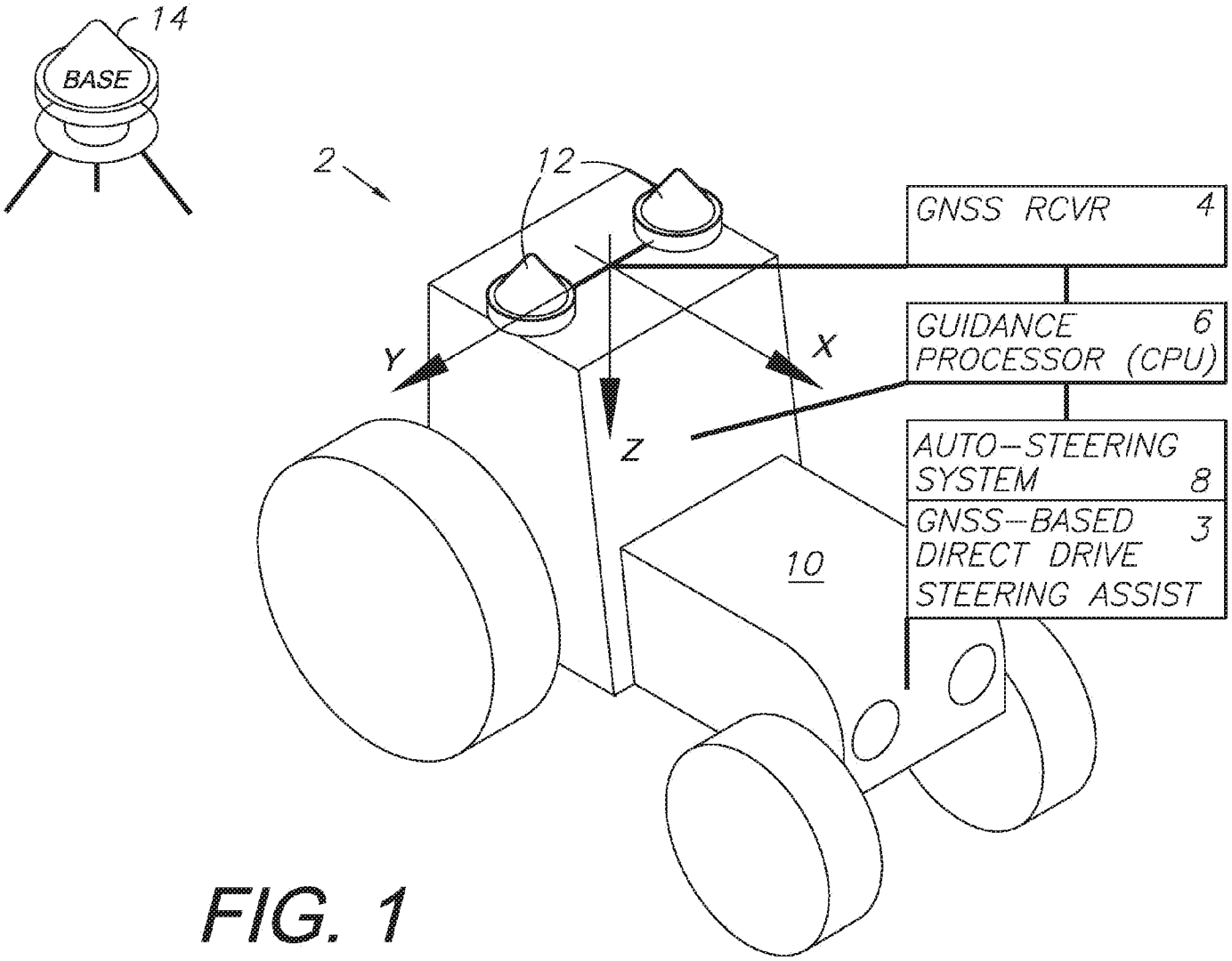
FIG. 1 is an isometric view of a tractor with a block diagram of a vehicle control system with GNSS and automatic steering subsystems and embodying an aspect of the present invention.

Referring to the drawings in more detail and as shown in FIG. 1, the reference numeral 2 generally designates a GNSS guidance system implementing an electrical direct-drive steering assistance mechanism 3, embodying an aspect of the present invention. Without limitation on the generality of useful applications of the guidance system 2, a GNSS receiver 4 and a guidance processor 6 are connected to a GNSS antenna 12 and installed into a vehicle 10, such as an agricultural vehicle or tractor. An auto-steering system 8 is electrically connected to the guidance processor 6, and is mechanically interfaced with the vehicle 10 via the steering assistance mechanisms 3. A remote base station 14 is placed in proximity to the working field which provides for differential GNSS guidance.

Figure 2:
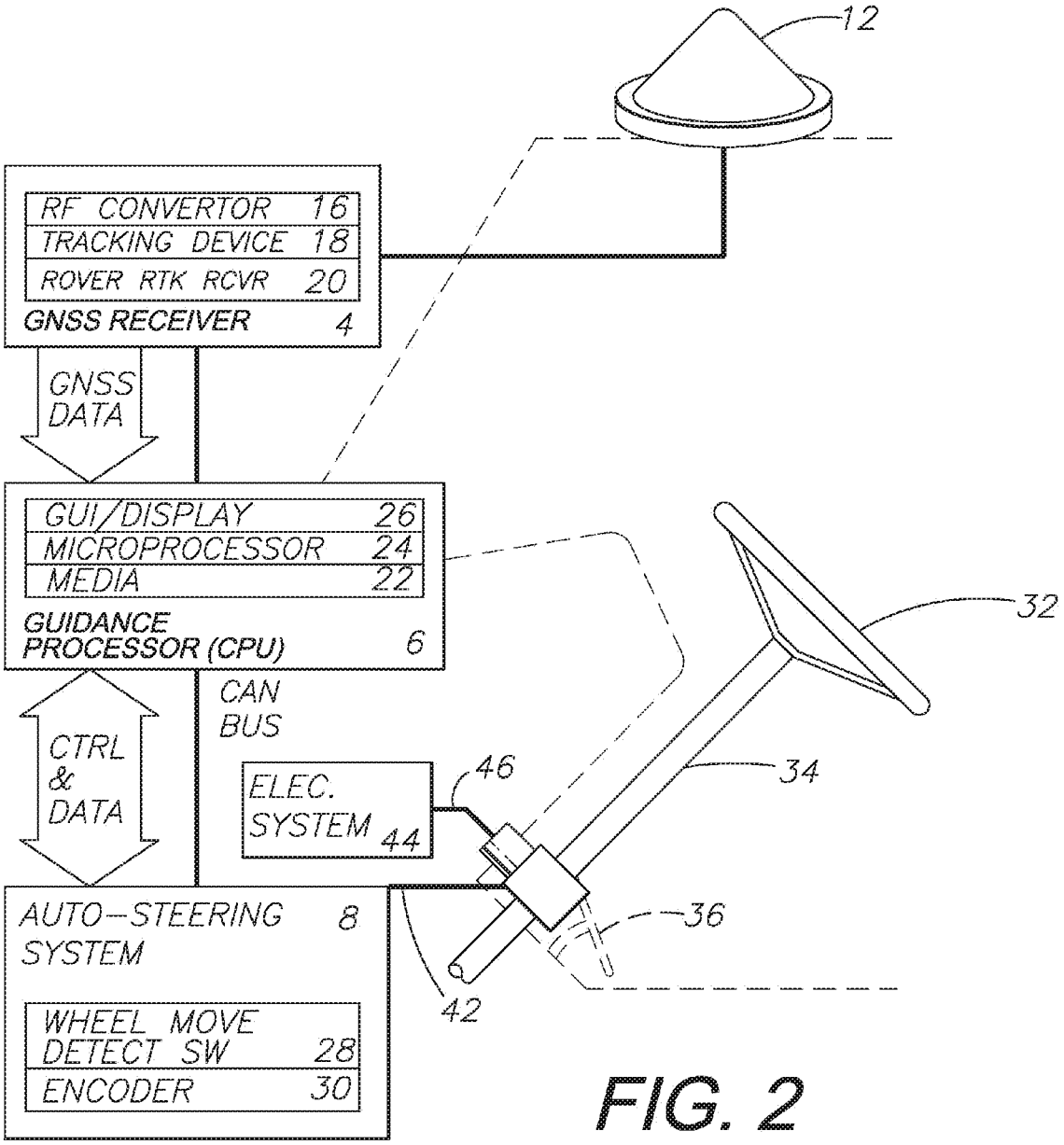
FIG. 2 is a block diagram of a vehicle control system with GNSS and automatic steering subsystems and embodying an aspect of the present invention.

FIG. 2 displays additional detail for the guidance system 2. The GNSS receiver 4 is further comprised of an RF convertor (i.e., downconvertor) 16, a tracking device 18, and a rover RTK receiver element 20. The receiver electrically communicates with, and provides GNSS positioning data to, the guidance processor 6. This processor includes a graphical user interface (GUI) 26, a microprocessor 24, and a media element 22, such as a memory storage drive. The processor electrically communicates with, and provides control data to the auto-steering system 8. The auto-steering subsystem includes a wheel movement detection switch 28 and an encoder 30 for interpreting guidance and steering commands from the CPU 6.

The auto-steering system 8 primarily interfaces mechanically with the vehicle's steering column 34, which is mechanically attached to the physical steering wheel 32. A control line 42 transmits guidance data from the CPU 6 to the auto-steering system 8. An electrical subsystem 44, which powers the electrical needs of the vehicle 10, interfaces directly with the auto-steering system 8 through a power cable 46. The auto-steering subsystem can be mounted to the steering column 34 near the floor of the vehicle, and in proximity to the vehicle's control pedals 36. Alternatively, the auto-steering system 8 can be mounted at other locations along the steering column 34.

Figure 3:
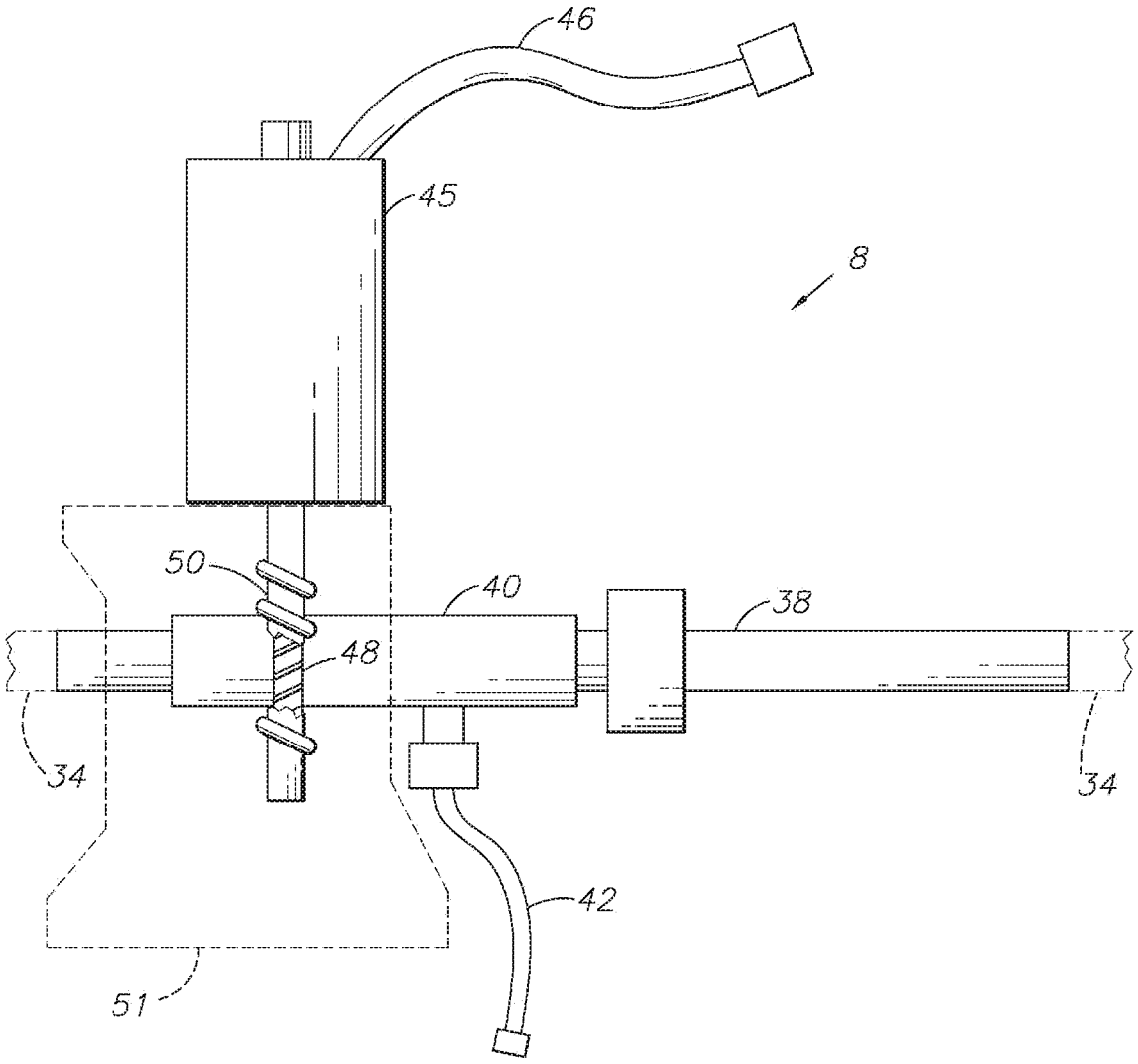
FIG. 3 is a plan view of an automatic steering subsystem embodying an element of an aspect of the present invention.

The auto-steering system 8 is shown in further detail in FIG. 3. A mounting rod 38 mounts the auto-steer system directly to the steering column 34. The main body 40 of the auto-steering system 8 is housed along the mounting rod, and includes the wheel move detection switch 28 or other means for detecting when the user desires to end the auto-steering commands.

The auto-steering system 8 physically drives and steers the vehicle 10 by actively turning the steering wheel 32 via the steering column 34. A motor 45 powered by the vehicle's electrical subsystem 44 powers a worm drive 50 which powers the worm gear 48 affixed to the auto-steering system 8. These components are preferably enclosed in an enclosure 51.

Figure 4:
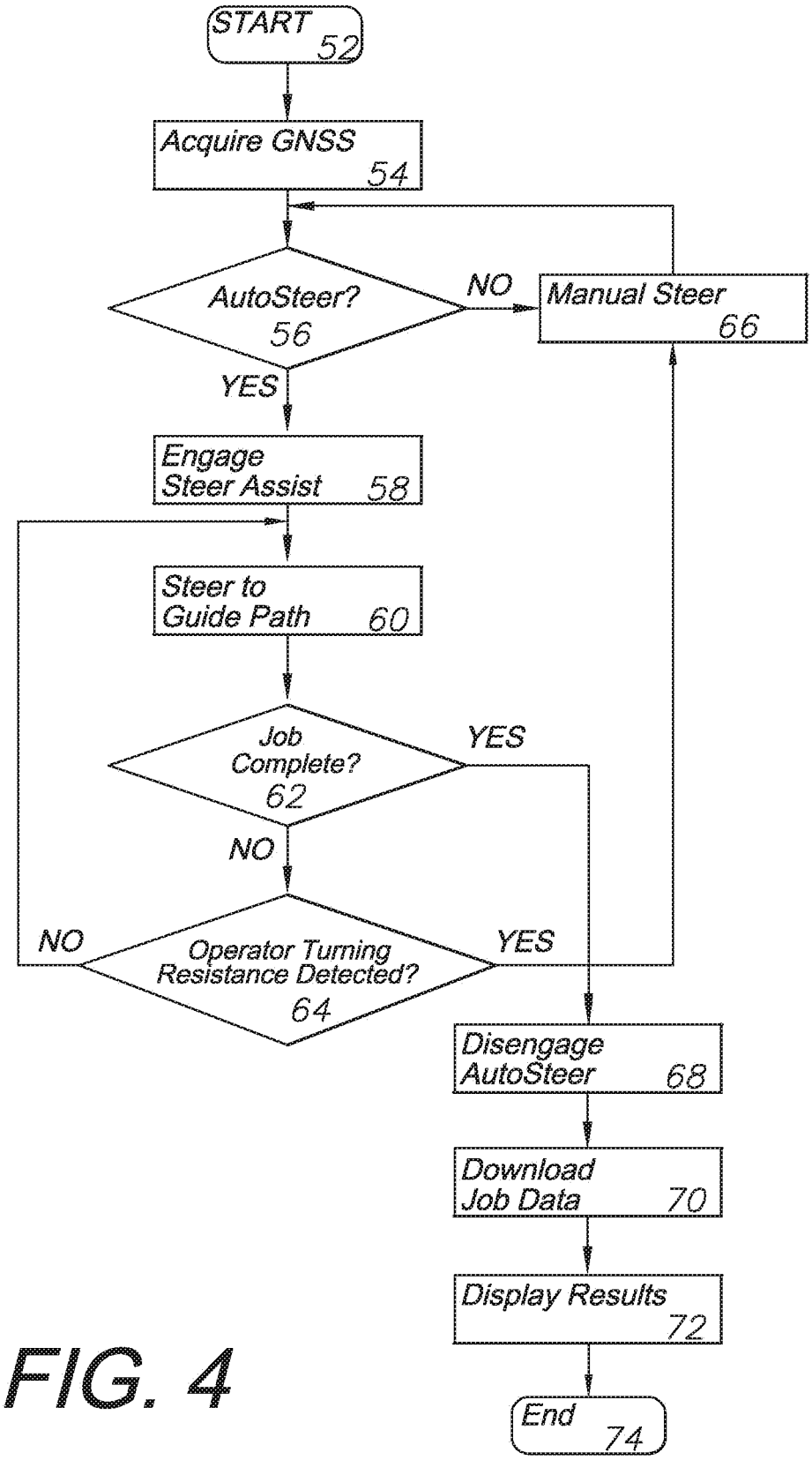
FIG. 4 is a flowchart demonstrating a method of practicing an embodiment of the present invention.

FIG. 4 demonstrates how a user would actively operate a vehicle with the preferred embodiment system presented above. The method of operating the system starts at 52. The GNSS receiver 4 acquires a GNSS signal at 54 and determines the vehicle's geographic position from this data. The GNSS receiver communicates this data to the CPU 6, which determines where the vehicle should be, according to predetermined or actively-provided instructions for working the agricultural vehicle 10.

The user determines whether to engage the automatic steering feature at 56. If the user opts not to engage auto-steer, the user may maintain manual steering at 66. This allows the user to initially place the vehicle in a starting position.

If the user elects to activate auto-steering at 56, the auto-steering system engages at 58. The auto-steer features are similar to an electrical steering assist system commonly used with all-terrain-vehicles (ATVs). In an ATV, the electrical steering assist system engages when the system detects that the user is struggling because the wheels have encountered an obstacle or due to low ATV speeds. The electrical steering assist provides power to the steering column and actively aids the user in turning the wheels. In the present invention, this feature is reversed: when the auto-steering system is engaged, it automatically guides the vehicle along the path at 60 as instructed by the CPU until either the job is completed at 62, or until the operator manually grips the steering wheel and turns it at 64.

The operator's turning of the steering wheel at 64 cuts off the electrical auto-steer system, defaulting to manual steer control at 66. This is either caused by an automatic switch 28 which shuts off the auto-steer, or by use of a slip-gear which bypasses the worm drive's ability to control the steering column. The user may re-engage auto-steer at 56 at any time thereafter, either by activating a switch or by merely releasing the steering wheel.

If the job is complete at 62, the user disengages auto-steer at 68 in the same manner as above—either by flipping a switch or by manually gripping and turning the steering wheel, thereby over-riding auto-steer.

Once the job is completed and auto-steer is disengaged at 68, the job data may be downloaded to a portable device or an off-site computer at 70. This data can be used to improve field working procedures in the future. The data will determine if there was ever a time where the user manually took control of the vehicle, and will record the path taken by the user while auto-steer was disengaged. The next time this particular field is worked, the user will have the option to force the auto-steer system to follow the new path previously manually driven by the operator. The recorded results are displayed at 72 and the operation ends at 74.

It is to be understood that the invention can be embodied in various forms, and is not to be limited to the examples discussed above.

Having thus described the disclosed subject matter, what is claimed as new and desired to be secured by Letters Patent is:

1. A guidance system for a vehicle including steerable wheels and a steering mechanism connected to the steerable wheels, *the steering mechanism including a steering column mounting a steering wheel,* which guidance system includes:

[a GNSS-based guidance subsystem including a GNSS receiver, a guidance processor including] a guidance CPU connected to [the] *a GNSS-based guidance subsystem and a GNSS* receiver *thereof*, an output from said guidance [processor] *CPU* for providing *a* steering signal output, a graphical user interface (GUI) connected to the guidance [processor] *CPU*, and a memory storage device connected to the [processor] *guidance CPU*;

an automatic steering subsystem including a drive connected to the steering mechanism and an encoder connected to the steering mechanism and the guidance [processor] *CPU*;

said drive including a motor connected to [said] *an* electrical subsystem; and

[an electrical subsystem connected to said automatic steering subsystem] *a slip gear mechanically interfaced with said steering mechanism adapted to disconnect said drive from said steering mechanism.*

2. The system of claim 1, further comprising:

[the vehicle steering mechanism including a steering column mounting a steering wheel; and]

a worm drive interfacing with said automatic steering subsystem and said steering column, *wherein the slip gear is adapted to bypass said worm drive.*

3. The system of claim 2, wherein said automatic steering subsystem is mounted in proximity to said steering column.

4. The system of claim 2, further comprising a mounting rod mounting said automatic steering subsystem to said steering column.

5. The system of claim 2, further comprising:

a wheel movement detection switch integrated into said automatic steering system; and said wheel movement detection switch adapted to interrupt said automatic steering subsystem when said steering wheel is manually turned.

[6. The system of claim 2, further comprising:

a slip gear adapted to bypass said worm drive, said slip gear mechanically interfaced with said steering column.]

7. A system for controlling an agricultural vehicle including a steering column connected to steerable wheels and mounting a steering wheel, which guidance system includes:

a GNSS guidance subsystem including [an RF converter,] a GNSS receiver[,] and a GNSS antenna;

an automatic steering subsystem including a worm drive having a worm gear, [and an encoder;] *said automatic steering subsystem mechanically interfaced with said steering column via said worm drive and*

[an electrical subsystem adapted for powering a plurality of electrical components of the vehicle, said electrical subsystem interfaced with said automatic steering subsystem via a power cable;]

said worm drive powered by a motor connected to [said] *an* electrical subsystem;

a guidance CPU electronically connected to said GNSS guidance subsystem[,] *and* said automatic steering subsystem, a graphical user interface (GUI), and a memory storage device; *and*

[said automatic steering subsystem mechanically interfaced with said steering column via said worm drive;

a mounting rod mounting said automatic steering subsystem to said steering column;

a wheel movement detection switch integrated into said automatic steering system; and said wheel movement detection switch adapted to interrupt said automatic steering subsystem when said steering wheel is manually turned] *a slip gear mechanically interfaced with said steering column and adapted to bypass said worm drive.*

8. A method of controlling a vehicle having a steering column attached to a steering wheel, the method comprising the steps:

providing a GNSS guidance subsystem including an RF converter, a GNSS receiver and a GNSS antenna;

providing an automatic steering subsystem including a worm drive having a worm gear, and an encoder;

connecting said GNSS guidance subsystem and said automatic steering subsystem to an electrical subsystem integrated into the vehicle, said electrical subsystem powering a plurality of electrical components connected to said vehicle;

interfacing said worm drive with the steering column of the vehicle;

providing a guidance CPU electronically connected to said GNSS guidance subsystem and said automatic steering subsystem;

locating said vehicle location with said GNSS guidance subsystem;

sending guidance instructions to said automatic steering subsystem with said guidance CPU; [and]

steering the vehicle along a predetermined path by mechanically operating said steering column with said automatic steering subsystem, thereby guiding the vehicle*;*

*providing a slip gear interfaced with said steering column;*

*activating said slip gear, thereby deactivating said automatic steering subsystem;*

*deactivating said slip gear; and*

*reactivating said automatic steering subsystem.*

[9. The method according to claim 8, further comprising the steps:

providing a slip gear interfaced with said steering column;

activating said slip gear, thereby deactivating said automatic steering subsystem;

deactivating said slip gear; and reactivating said automatic steering subsystem.]

10. The method according to claim 8, further comprising the steps:

providing a wheel movement detection switch integrated into said automatic steering system;

detecting manual interference of said steering wheel with said wheel movement detection switch; and activating said automatic steering subsystem.

*11. A system for controlling a vehicle including a steering column mounting a steering wheel, comprising:*

*a guidance central processing unit (CPU) to:*

*receive signals from a global navigation satellite system (GNSS);*

*identify a location of the vehicle based on the signals received from the GNSS;*

*send guidance instructions to an automatic steering subsystem to steer the vehicle along a predetermined path based on the identified location of the vehicle;*

*detect manual interference of the automatic steering of the vehicle by the automatic steering subsystem;*

*deactivate the automatic steering subsystem based on the detected manual interference; and*

*activate a slip gear interfaced with the steering column to deactivate the automatic steering subsystem.*

*12. The system of claim 11, further comprising the guidance CPU to cause the automatic steering subsystem to steer the vehicle by controlling movement of the steering column for the steering wheel.*

*13. The system of claim 11, further comprising the guidance CPU to:*

*receive a signal from a steering wheel movement detection switch to detect the manual interference of the automatic steering of the vehicle; and*

*deactivate the automatic steering subsystem in response to the signal from the steering wheel movement detection switch.*

* * * * *